Sept. 23, 1952 F. J. DARKE, JR 2,611,816

DEFLECTION CONTROL SYSTEM

Filed Feb. 28, 1948 3 Sheets-Sheet 1

Inventor

Francis J. Darke, Jr.

By [signature]

Attorney

DEFLECTION CONTROL SYSTEM

Filed Feb. 28, 1948 3 Sheets-Sheet 2

Inventor
Francis J. Darke, Jr.
By [signature]
Attorney

Sept. 23, 1952 F. J. DARKE, JR 2,611,816

DEFLECTION CONTROL SYSTEM

Filed Feb. 28, 1948 3 Sheets-Sheet 3

Inventor

Francis J. Darke, Jr.

By Oliver J. Mitchell

Attorney

Patented Sept. 23, 1952 2,611,816

UNITED STATES PATENT OFFICE 2,611,816

DEFLECTION CONTROL SYSTEM

Francis J. Darke, Jr., Princeton, N. J., assignor to Radio Corporation of America, a corporation of Delaware Application February 28, 1948, Serial No. 12,083

18 Claims. (Cl. 178—5.2)

This invention relates to scanning raster accuracy control and more particularly to methods and circuit arrangements for improving registration of selected component or primary color images in a simultaneous color television system.

The transmission of images of finite detail and discontinuous or limited motion by electricity has best been solved by the process of scanning, which consists of moving an exploring element, spot or point over the image to be transmitted in a periodically repeated path covering the total image area. The exploring element generates a signal which indicates the brightness of the image area at the instantaneous position of the exploring point. The signal is then transmitted over the communication channel to the reproducing station where a like spot or point whose brightness is controlled by the signal and whose movement is in synchronism with the exploring point at the transmitting station causes an image to be reproduced.

In order to obtain geometrically accurate and natural proportions in image reproduction, it is necessary that the transmitting and receiving rasters be similar.

According to the U. S. patent to George L. Beers, No. 2,385,563, dated September 25, 1945, the velocity of an exploring point is converted into a frequency which is compared to a standard frequency of a tuned circuit. Any change in frequency or phase is employed to provide a control potential which may vary in both magnitude and polarity. This control potential may be used in any desired manner, for example, it may be used to maintain synchronism or to control the velocity of an exploring point, such as the end of a moving stylus or the spot produced by an electron beam impinging on a surface which is to be explored. The last named example will be recognized as being of particular value in the television art.

It has become quite familiar to the television art that images in substantially their natural color may be reproduced at a remote location by not only dividing the images into elemental areas and transmitting electrical signals representative of the intensity of the various elemental areas, but by also dividing an image into selected component colors which may be transmitted in sequence over an electrical circuit for utilization at a receiving station.

A more satisfactory method for transmitting images in substantially their natural color has become known as the "simultaneous" method, wherein signals representative of each of the selected component color or primary color images are transmitted simultaneously over separate electrical circuits. The component color images are then superimposed in optical registry at the receiving station to form a color image.

It will be appreciated, however, that the superpositioning of component color images must be accomplished to a reasonably high degree of accuracy in order to provide for satisfactory color images at the receiving stations.

It will be appreciated that such a requirement can be met only by employing scanning rasters having a high degree of accuracy.

The co-pending U. S. application of Ray D. Kell, Serial No. 772,978, filed September 9, 1947, and entitled "Scanning System," shows and describes arrangements and methods for improving scanning accuracy and providing precise registration of a plurality of scanning rasters in a vertical direction. According to the U. S. application of R. D. Kell referred to immediately above, the scanning target has a control element or area having a selected edge extending along a scanning line. Circuit arrangements are connected to the elements in such a manner as to derive an electrical indication of the relative position of the point of scansion with regard to the selected edge of the control element. The circuit arrangements then provide a raster positioning signal to furnish accurate registration with other scanning rasters.

According to this invention, methods and arrangements are provided for improving scanning accuracy and establishing improved registration between a plurality of scanning rasters.

According to this invention, an optically registered pattern is associated with each scanning raster. The pattern is scanned to form an alternating voltage whose amplitude is indicative of relative position in a first or vertical direction and whose frequency is indicative of the relative velocity of the exploring point. The alternating voltage is converted into a first control voltage by detection to control the position of the exploring point in the first or vertical direction, while a second control voltage is developed by frequency comparison with a frequency standard to control the velocity of the exploring point. The control of velocity of the exploring point regulates position in a second or horizontal direction.

A primary object of this invention is to improve scanning accuracy.

Another object of this invention is to permit accurate registration of a plurality of independent scanning rasters.

Another object of this invention is to improve the registration of color television images.

Other and incidental objects of the invention will be apparent to those skilled in the art from a reading of the following specification and an inspection of the accompanying drawing in which:

Figure 1 shows by block diagram one form of this invention;

Figures 2 and 3 indicate schematically the operation of this invention;

Figures 10, 11:
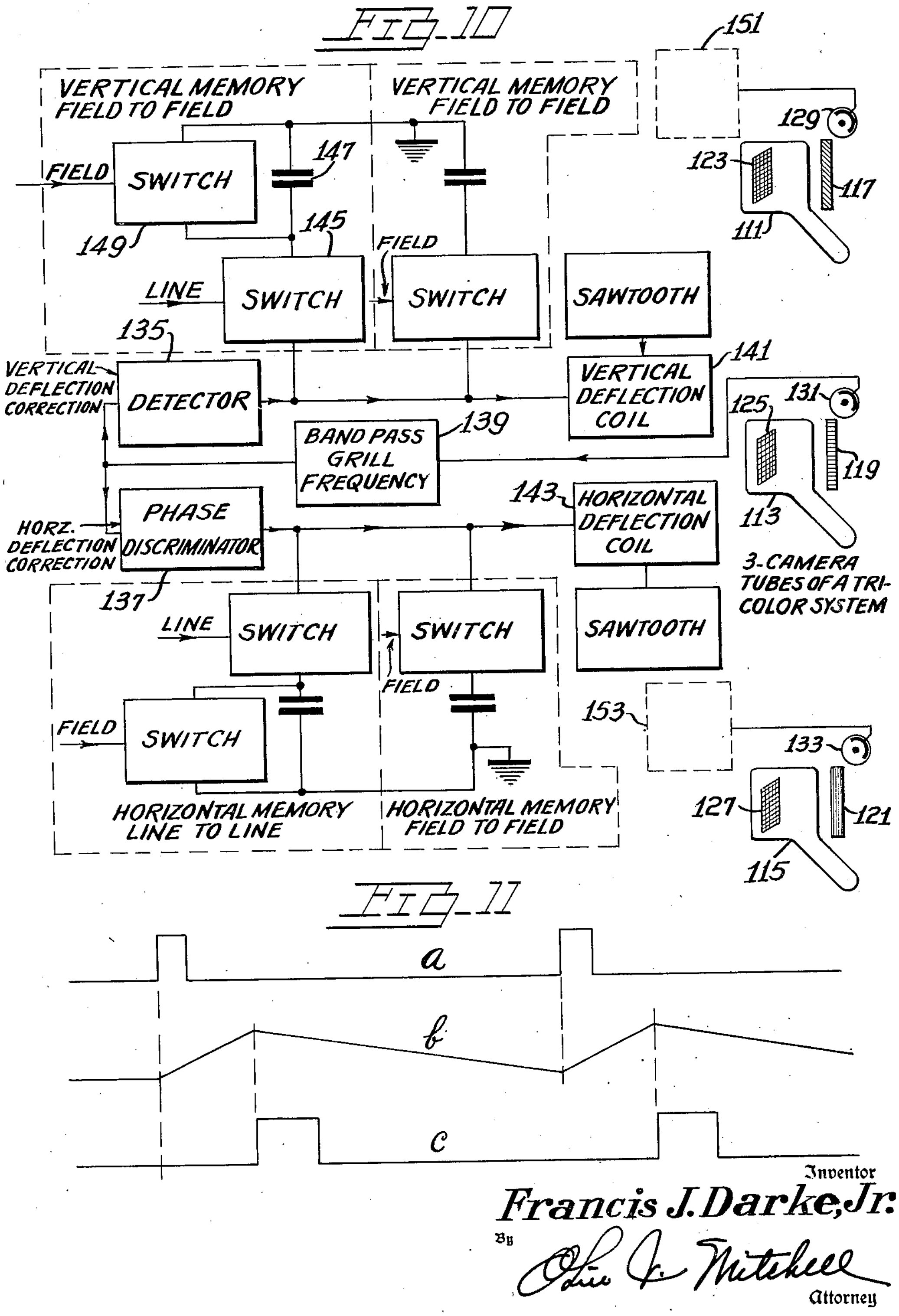

Figure 10 shows in block the employment of this invention with a memory circuit of the type shown and described in detail in the concurrently filed U. S. application of Alda V. Bedford, entitled "Scanning Control System," Serial No. 12,091, filed February 28, 1948 (D-26165); and Figure 11 shows graphically the operation of the arrangement shown in Figure 10.

Figures 1, 2, 3, 4, 5, 6:
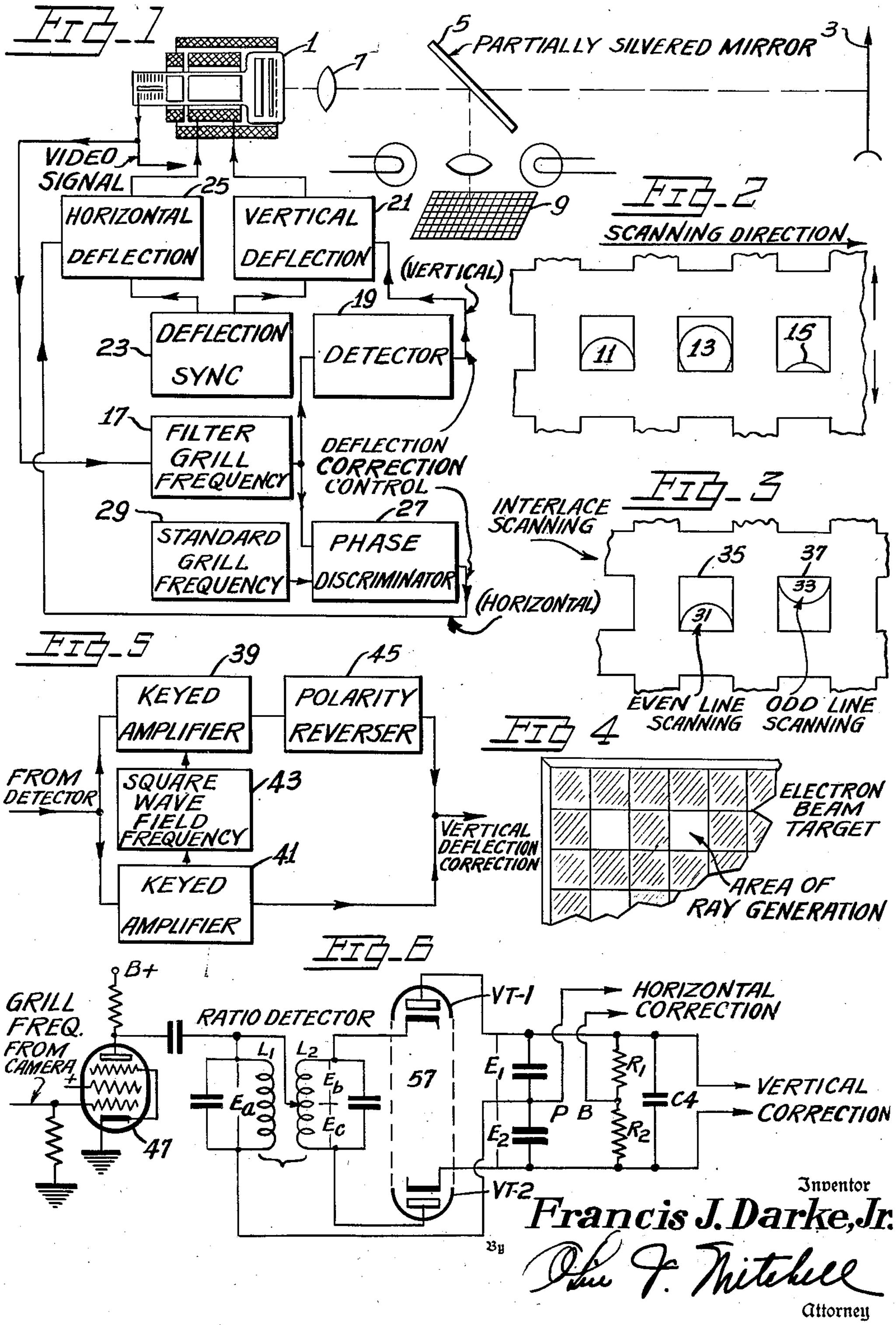
Figure 4 illustrates an electron beam target in accordance with one form of this invention.
Figure 5 shows in block a portion of another form of this invention.
Figure 6 shows by circuit diagram a ratio detector suitable for employment in the practice of this invention.

Turning now in more detail to Figure 1, there is illustrated a television camera tube 1 which, for the purpose of example, has been illustrated as an image orthicon including an image section and an electron multiplier. The details regarding the image orthicon and its mode of operation are quite well known in the television art and are believed to be sufficiently well shown and described in published literature to obviate the necessity of a detailed description here. A complete description of the image orthicon television pickup tube may be found in an article entitled "The Image Orthicon, A Sensitive Television Pickup Tube," publishing in the "Proceedings of the Institute of Radio Engineers" for July 1946.

The inclusion of the image orthicon in a television camera may be found well described in an article entitled "Image Orthicon Camera" published in the "RCA Review" for March 1946.

It is not intended that the operation of this invention be limited to the image orthicon type of camera tube, but the practice of this invention will also be found advantageous for use with other types of camera tubes, such as the popular iconoscope.

The image pickup tube 1 obtains light from object 3 through a partially silvered mirror 5 and a lens system 7.

The video signal obtained from the camera tube 1 is employed in any of the well known manners, such as the modulation of a television transmitter.

In the practice of this invention, it is necessary to generate in the image pickup tube 1 an auxiliary signal which is employed for scanning deflection correction.

According to one form of this invention, as illustrated in Figure 1, this auxiliary signal is obtained by the employment of an auxiliary screen 9, which is suitably illuminated and caused to project an image on the sensitive electrode of tube 1. The image of the screen 9 projected on the target electrode of tube 1 produces a charge pattern of the type indicated on the screen 9. The charge pattern causes to be generated during the scanning operation a "grill" frequency. The explanation regarding the generation of this grill frequency may best be understood by a brief reference to Figure 2, which shows a greatly enlarged section of the pattern formed at the target electrode of image pickup tube 1.

Let it be assumed, for example, that the light from screen 9 of Figure 1 forms a charge pattern wherein areas of increased charge are indicated by the squares of Figure 2. Areas of reduced charge are indicated by the screen-like sections surrounding the squares. If, now, it is assumed that the scanning element or exploring point is positioned as illustrated and designated 11, its horizontal movement across the charge pattern will generate an alternating voltage whose amplitude is governed by its vertical position, while the frequency of the alternating voltage is governed by its velocity. This will be more readily understood when the position of the scanning element 13 is examined. When the element is travelling horizontally at a height 13, it will be seen that a greater portion of the increased sensitivity areas is intercepted, thus generating in the auxiliary or grill frequency voltage a greater amplitude. Likewise, when the exploring point is at position 15, its horizontal movement does not intercept much of the increased sensitivity area so that the amplitude of the generated auxiliary alternating voltage is not great.

Referring back now to Figure 1, the filter grill frequency 17 is employed to separate the auxiliary alternating voltage of grill frequency from the video signal. The output signal of the filter 17 is then applied to a detector 19.

In accordance with the well known theory of operation of detectors, the output of detector 19 is a direct current potential whose amplitude is proportional to the alternating voltage passed by filter 17.

This direct current voltage obtained from detector 19 is then applied to the vertical deflection arrangement of image pickup tube 1 to provide a correction in the deflection. For example, if the position of the exploring point is at 13 of Figure 2, it may be assumed that the output of detector 19 in producing a large direct current voltage causes in the vertical deflection arrangement 21 a force which will tend to pull the exploring point downward. On the other hand, if the exploring point is at position 15 of Figure 2, the output voltage of detector 19 is low, and therefore the effect of the direct current voltage from detector 19 is lesser and the exploring point tends to raise.

Vertical deflection arrangement 21, the source of deflection synchronizing voltage 23 and the horizontal deflection arrangement 25 are shown in block in view of the fact that no particular arrangement is necessary, but that any of the well known forms may be employed.

Details regarding the employment of the direct current voltage from detector 19 are not shown in Figure 1, but may take the form of an auxiliary coil or inclusion with the energy applied to the deflection coils of the image pickup tube 1. A suitable arrangement will be described in more detail below.

As has been indicated above, the velocity of the exploring point may also be controlled. This is accomplished by passing some of the auxiliary control signal obtained from filter 17 to phase discriminator 27, which compares the grill frequency with a standard frequency illustrated in block 29. In accordance with the operation of phase discriminators, any deviation of the grill frequency obtained from filter 17 with respect to the standard grill frequency obtained from block 29 will result in a change in direct current voltage which is applied to horizontal deflection arrangement 25. Suitable phase discriminators in the form of a ratio detector and frequency discriminators will be described in detail below.

It will be seen, therefore, that if the velocity of the exploring point exceeds a predetermined amount, a direct current potential obtained from phase discriminator 27 will tend to slow down the speed of the exploring point in horizontal deflection arrangement 25, while if the exploring point is travelling at too slow a speed, a control voltage will be applied to horizontal deflection arrangement 25 which will tend to speed up the exploring point in its traverse.

Although the practice of this invention is applicable to "linear" type scanning wherein each succeeding scanning line is traversed immediately following the preceding scanning line, another form of this invention is applicable to the popular interlaced type of scanning wherein one field of scanning involving only the odd lines is followed by a second field of scanning involving only the even lines.

Although the form of the invention shown in Figure 1 is also suitable for interlaced scanning, another form of the invention is illustrated in Figure 5, which is particularly applicable to the interlaced type of scanning.

Turning now to Figure 3, which illustrates the operation of this invention as applied to interlaced scanning, it will be seen that the control of the vertical position of the scanning or exploring point 31 will be opposite in direction to that of the control of the exploring point 33. Let it be assumed that odd lines are along the upper edges of the areas 35 and 37, while even lines are along the lower edges of the areas 35 and 37. This is indicated by the exploring point 31 in the even line, while exploring point 33 is in the position of the odd line.

It becomes apparent that during odd lines, the vertical control must be inverted with respect to the vertical control during even lines.

In accordance with the practice of this invention, this is accomplished by the employment of circuit arrangements illustrated in block as Figure 5.

Voltage from the detector, such as detector 19 of Figure 1, is applied to two keyed amplifiers 39 and 41. A square wave field frequency indicated by block 43 alternately switches keyed amplifiers 39 and 41 into operation during alternate field scannings. A polarity reverser 45 reverses the polarity of the energy obtained from keyed amplifier 39 in order that the vertical deflection correction voltage may be applied to the vertical deflection arrangement, as indicated by block 21 of Figure 1.

Keyed amplifiers and polarity reversers are believed to be sufficiently well known to the radio art that they need no detailed description here.

Turning now in detail to Figure 4, there is illustrated another form of this invention involving a special electron beam target which eliminates the necessity of having the screen 9 and the partially silvered mirror 5 of the form of the invention shown in Figure 1.

The electron beam target of Figure 4 takes a form wherein there are auxiliary areas of ray generation material whose radiations may be picked up by suitable electrical means. It will be seen that during the scanning of the pattern, the electrical current or electrical voltage formed by the scanning operation as a result of the generation of rays will be suitable for employment for control of deflection in accordance with this invention. It has also been proposed to provide a target having areas of invisible light sensitivity. By suitably forming the areas in accordance with the teachings of this invention and utilizing auxiliary sources of invisible light, electric control voltages may be generated which will be suitable for use in connection with the control arrangements taught by this invention.

Turning now to Figure 6, there is illustrated a ratio detector suitable for employment in the practice of this invention. The ratio detector illustrated is well shown and described in an article entitled "New Ratio Detector Simplifies FM Receiver Design" by Stuart W. Seeley, published in "Broadcast News" for January, 1946.

Tube 47 obtains the grill frequency from the camera tube and applies it through suitable coupling arrangements to double diode 57, which produces in its output circuit a signal train whose amplitude is equal to the ratio of the grill frequency obtained from the camera to the natural frequency of the tuned circuit 55.

The function and operation of the discriminator as applied to this invention may best be understood by a review of its theory of operation. Such review may best be made by reference not only to the ratio detector illustrated by circuit diagram in Figure 6, but by including in the discussion of the theory of operation the popular frequency discriminator employed in the circuit diagram of the form of the invention shown in Figure 7. The following discussion will therefore be directed to both the ratio detector of Figure 6 and the discriminator of Figure 7, wherein like element designations refer to like elements.

Inductances $L_1$ and $L_2$ form an interstage coupling transformer tuned to the desired standard or grill frequency. The voltage at $E_a$ in the primary induces a voltage in the secondary which, for the purposes of discussion, may be divided into two components, $E_b$ and $E_c$. The induced voltage in the secondary is fed to the anodes of a pair of diodes, as shown. However, there is also a direct connection from one side of $L_1$ to the center of $L_2$. This places $L_2$ directly in the cathode return circuit of the diodes. Thus the total voltage on the anode of the first diode (VT-1) is $E_a+E_b$. These voltages must, of course, be added vectorially. When the frequency of the voltage from the input circuit is equal to the resonant frequency of the tuned circuit, the voltage in the secondary is 90° out of phase with that in the primary. The voltages $E_1$ and $E_2$, which are fed to the diodes, are equal and the D.-C. output of the diodes is also equal. Since the output connections of the diodes are opposed in the discriminator of Figure 7, no voltage will appear at the output terminals.

Let us now consider what happens when the input voltage frequency is different from the resonant frequency of the tuned circuit, as will occur if the velocity of the exploring point deviates from a desired standard. The secondary voltage leads the primary voltage by something less than 90°. The voltages $E_1$ and $E_2$ fed to the diodes are now different, and the rectified outputs are also of different values. Thus, a D.-C. voltage proportional to the frequency deviation of the input signal is caused to appear at the output terminals.

Figures 7, 8, 9:
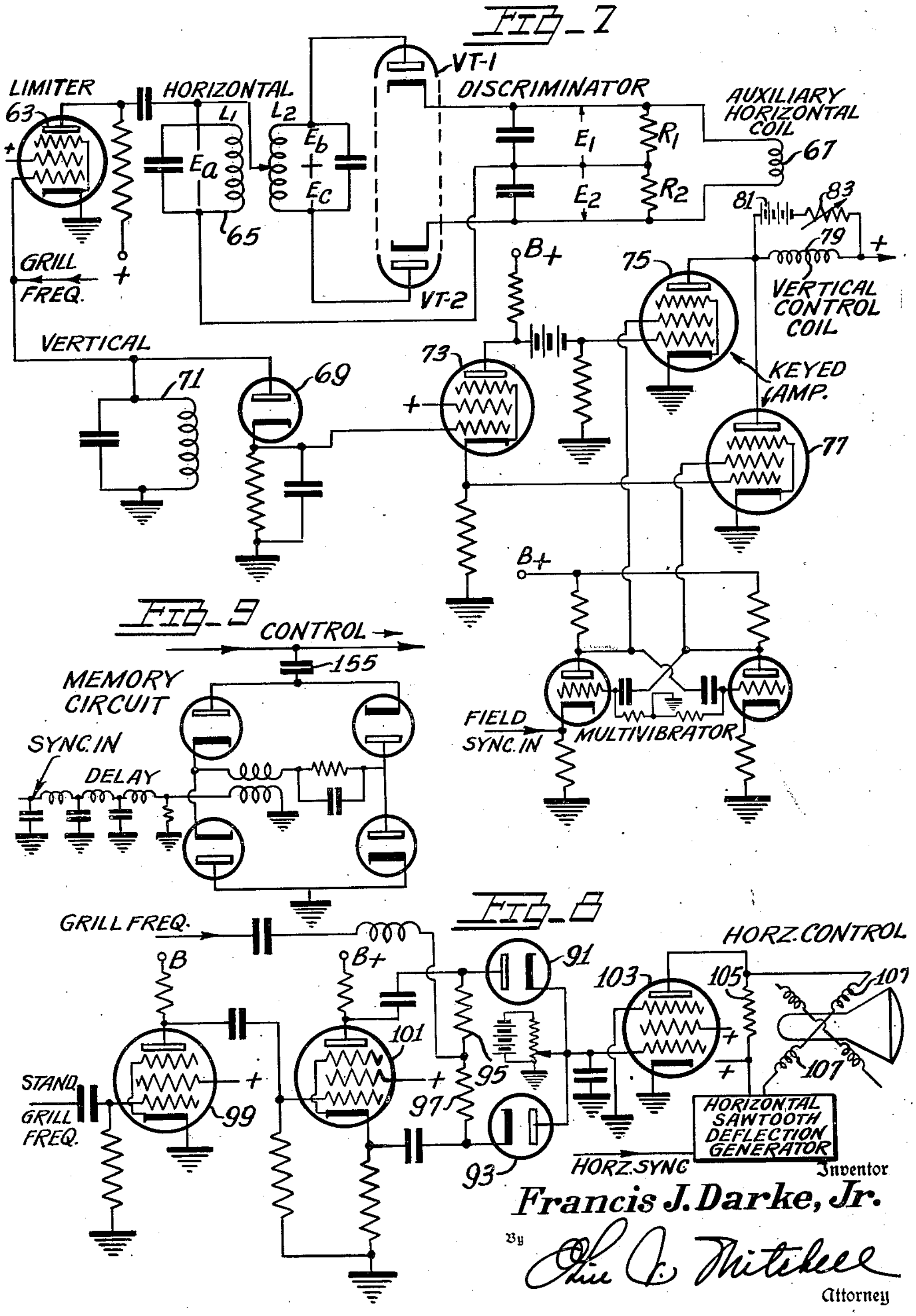
Figure 7 shows by circuit diagram still another form of this invention.
Figure 8 shows by circuit diagram another form of this invention.
Figure 9 illustrates by circuit diagram a suitable keying arrangement with associated delay network suitable for employment in a memory circuit which may be employed in connection with this invention.

An important characteristic and a decided disadvantage of this standard discriminator circuit of Figure 7 is that it is also sensitive to amplitude fluctuations of voltage in the input circuit. It is therefore necessary in employing the discriminator of Figure 7 that there be provided ahead of the discriminator a limiter tube 63, as illustrated, the operation of which is also well known to the art. The output voltage of the limiter tube 63 is substantially constant, regardless of input voltage. The reason for the effect of amplitude on the discriminator circuit may be understood when it is appreciated that the voltages $E_a$, $E_b$ and $E_c$ vary proportionately with amplitude modulation, but $E_1$ increases more than $E_2$, thus causing distortion in the output circuit as a result of variations in amplitude of the input circuit. This is, of course, eliminated by the employment of a limiter tube 63.

However, the ratio detector illustrated in Figure 6 is insensitive to amplitude modulation, and hence requires no limiter stages. The reason for this may be understood by comparison of the circuit diagrams of the ratio detector and the discriminator. As will be noted, the input sections of both circuits are similar. The voltages fed to the diodes in the ratio detector are the same as those in the standard discriminator, and they vary with frequency swing in exactly the same manner. However, in the ratio detector the diodes are connected in series so that the D.-C. voltages which they develop are additive rather than being opposed, as in the discriminator circuit. Moreover, the sum of these voltages ($E_1+E_2$) is prevented from varying at alternating voltages by the bypass condenser $C_4$.

While the sum of the diode output voltages $E_1$ and $E_2$ is thus held constant, the ratio of these voltages varies as the ratio of the input voltages. Thus, if control connections are made at points P and B, a control voltage proportional to the frequency swing of the input voltage is made available. In this way the ratio detector provides for phase or frequency discrimination equally as good as the standard discriminator and free from the latter's unwanted sensitivity to amplitude modulation.

It will be seen, therefore, that suitable control voltages may be obtained for employment in the practice of this invention.

There is provided an auxiliary horizontal coil 67 in the output circuit of the discriminator. Auxiliary horizontal coil 67 may be coupled to the discriminator through an amplifier, if necessary. It will be seen that the voltage provided the auxiliary horizontal coil is dependent upon the frequency of the signal applied through limiter tube 63 with respect to the tuned circuit 65. A portion of the grill frequency is applied to the detector or rectifier 69 across the tuned circuit 71, which passes only the grill frequency. Detector 69 rectifies the grill frequency and applies it to an amplifier tube 73 which furnishes keyed amplifier tubes 75 and 77 with a direct voltage which is proportional to the amplitude of the alternating voltage in tuned circuit 71.

By suitable employment of a multivibrator, as indicated, driven in synchronism with the field synchronizing signal, the output of detector tube 69 is inverted in alternate fields to be applied to the vertical control coil 79 for vertical correction in accordance with the procedure employed with interlaced scanning, as described in connection with Figure 3 above.

The keyed amplifier tubes 75 and 77 furnish control energy to vertical control coil 79, which is associated with the deflection arrangement to provide suitable vertical correction information. Coil 79 may, as illustrated, be shunted with a biasing arrangement including battery 81 and variable resistor 83. It will be seen that by employing battery 81 and resistance 83, a suitable adjustment may be provided to eliminate any current flow in coil 79 except when correction voltage is necessary.

Turning now to Figure 8, there is illustrated still another form of this invention wherein the grill frequency obtained as a result of the scanning operation is applied to diodes 91 and 93, which are arranged in a bridge circuit involving resistances 95 and 97.

A standard or grill frequency is applied to tube 99 and converted into a push-pull voltage in tube 101. The push-pull voltage is also applied to the bridge circuit involving diodes 91 and 93. It is therefore possible to obtain a phase comparison between the standard frequency applied to tube 99 and the grill frequency applied to the bridge circuit. The output voltage of the bridge circuit involving diodes 91 and 93 is controlled by the relative frequency of the input alternating voltages. This control voltage obtained from diodes 91 and 93 is applied to tube 103, which contains in its output circuit a resistor 105 which is included in the normal horizontal sawtooth deflection generator circuit involving the horizontal coils 107. The theory of operation of the circuit shown in Figure 6 is well shown and described in the copending U. S. application of G. L. Fredendall entitled "Automatic Frequency Control System," Serial No. 547,355, filed July 31, 1944.

There are, of course, other suitable phase and frequency discriminators for employment in this invention, such as that phase detector shown and described in the copending U. S. application of Allen A. Barco entitled "Phase Detector," Serial No. 776,986, filed September 30, 1947, wherein a simplified phase detector for automatic frequency or phase control systems and the like is provided by obtaining a D.-C. control voltage from a control electrode of a triode upon whose anode has been impressed energy from one frequency generator and upon whose cathode is impressed a synchronizing voltage.

It must be remembered that all scanning processes are usually a series of discontinuous movements of the exploring point and are somewhat analogous to the movement of our line of sight when reading a printed page. Although the scanning control processes referred to above are well adapted for maintaining accuracy during any continuous scanning movement of an exploring point, or in systems having reasonably accurate scanning, normally the correction information necessary for starting any continuous scanning movement of the exploring point is lost between continuous movements. For example, during the scanning of a single field, which is generally recognized as the scanning over the extent of the image area, the information relative to the correction at the beginning of the scanning of the field is immediately lost, so that the exploring element may not start the scanning of the succeeding field from exactly the same position.

It is also true that if the inaccuracy of scanning should allow the exploring element to deviate from the desired position by a relatively great amount, the necessary correcting information would not be available and proper registration could not be had.

According to the invention shown and described in the concurrently filed U. S. application of Alda V. Bedford, Serial No. 12,091, filed February 28, 1948, (D-26165), there is provided a method and circuit arrangement for remembering the necessary correcting voltage between continuous scanning movements of the exploring point. A condenser is charged with the developed correction voltage at the beginning of any continuous scanning movement, and at the beginning of the next succeeding continuous scanning movement or at the beginning of each succeeding field scanning, the charge in the condenser is employed for position control to accurately position the exploring element.

Another form of this invention shown in Figure 10 illustrates the utilization of this invention in connection with the memory circuit arrangements taught by the aforementioned Bedford application.

In accordance with the theory outlined at the beginning of this specification that television images in substantially their natural color may be reproduced at a remote location by dividing the images into selected component colors, an arrangement is illustrated in Figure 10 whereby a particularly beneficial application of this invention is employed to register component color images.

Image pickup tubes 111, 113 and 115 are provided with associated component color filters 117, 119 and 121 which, for the purpose of example, are designated as red, blue and green filters.

It will be seen that the video signals of image pickup tubes 111, 113 and 115 may be utilized for radio transmission and will, if properly received, provide an image in substantially its natural color.

It is, of course, important that the three images be accurately registered.

Although not shown, a suitable optical light dividing arrangement is provided to cause the component color images to be projected on targets 123, 125 and 127. There is also provided, in accordance with the teachings of the television art such as the copending U. S. application of John Evans referred to above, an arrangement to provide an auxiliary ray upon the scanning of the targets 123, 125 and 127. Energy of this ray is picked up, for example, in photocells 129, 131 and 133.

Each of the target electrodes 123, 125 and 127 is provided with a pattern which is positioned in optical registry as related to the impressed image.

Control energy from photocell 131 is passed to detector 135 and phase discriminator 137 through band pass filter 139 in accordance with the explanation of the operation of this invention above.

Control voltage from detector 135 is passed to vertical deflection coil 141, while correction voltage from phase discriminator is passed to horizontal deflection coil 143.

In accordance with the detailed description included in the concurrently filed Bedford application, a memory arrangement is provided. The memory arrangement includes, for provision of vertical memory line-to-line, switch 145, controlled by delayed and shaped line synchronizing pulse, which connects condenser 147 into the control circuit for a short interval of time during the beginning of each scanning line. It will be seen that the charge on condenser 147 will control the correction at the beginning of each scanning line in accordance with the correction obtained at the beginning of the preceding scanning line.

It is necessary, however, that the condenser 147 be discharged during the field return time in order not to carry over the correction from the beginning of the last line of a field to the beginning of the first line of the next succeeding field. This is accomplished by keying switch 149 with a field synchronizing pulse.

Vertical memory field-to-field is also provided by a condenser and switch combination, as indicated in the dotted line block designated vertical memory field-to-field.

Similar circuit arrangements are employed for horizontal memory line-to-line and horizontal memory field-to-field, as illustrated.

Other similar combinations of vertical deflection correction detectors, horizontal deflection correction phase discriminators, band pass filters and memory circuits are employed with image pickup tubes 111 and 115 to be employed in connection with their respective deflection arrangements. An indication of this is illustrated by dotted squares 151 and 153.

Although electronic switches are well known to the radio art, a suitable type of electronic switch, together with an associated delay circuit, is illustrated in Figure 9.

Condenser 155, which is employed as a memory condenser in the control circuit, is switched into the circuit by the diode arrangement shown in Figure 9. The operation of such circuit is well known to the art and functions to provide a closed circuit only during the impressed synchronizing pulse time interval. The associated delay circuit illustrated in Figure 9 appropriately delays the synchronizing pulse in order that it will occur during actual line or field scanning time.

The delay of the synchronizing pulse is best illustrated in Figure 11, wherein curve *a* illustrates the synchronizing pulse, either line or field, while curve *b* illustrates the associated sawtooth wave employed for deflection. Curve *c* shows the position with respect to time of the delayed synchronizing pulse which is employed to control the switches in the circuit.

Although the explanation of this invention is limited to certain applications and forms, it is not intended that the practice of the invention should be limited thereto. The circuit arrangements provided in the various forms of this invention may be employed with any deflection circuit, whether they be for a single scanning tube or whether they be employed in a multiple system.

The explanation of the operation of this invention has also been directed particularly to image pickup devices. It is, of course, important to remember that the practice of this invention may not necessarily be limited thereto, but may be applied with equal advantages to image reproducing systems.

Having thus described the invention, what is claimed is:

1. A control system comprising in combination, means for optically developing a checkerboard type pattern bearing a relation to a desired scanning raster, means for scanning said pattern with an exploring point to form an alternating voltage whose amplitude is indicative of relative position in a first direction and whose frequency is indicative of the relative velocity of said exploring point, means for developing a first control voltage from said alternating voltage by rectification, means for developing a second control voltage from said unrectified alternating voltage by frequency comparison with a predetermined frequency, and means for controlling the position of said exploring point in said first direction with said first control voltage and controlling the velocity of said exploring point with said second control voltage.

2. A scanning control system comprising, means for forming a crossed line charge pattern bearing a form relation to a desired scanning raster, means for scanning said charge pattern with an exploring point to form an alternating voltage whose amplitude designates relative vertical position of the exploring point and whose frequency designates relative velocity of the exploring point, means for developing a vertical control voltage from said alternating voltage by generating a direct voltage proportional to the amplitude of said alternating voltage, means for developing a velocity control voltage from said alternating voltage by frequency comparsion with a standard alternating voltage, means for controlling the vertical position of said exploring point with said vertical control voltage, and means for controlling the velocity of said exploring point with said velocity control voltage.

3. A system for generating scanning control voltages comprising in combination a distinguishable pattern, an exploring point, a deflection arrangement to cause said exploring point to scan said pattern in a predetermined scanning raster, said pattern distributed in repeating spaced areas along lines oriented in the direction of line scanning, a filter circuit responsive only to the signal frequency generated by the scanning of said pattern, a detector connected to said filter circuit to convert said alternating voltage into a direct voltage, a frequency discriminator connected to said filter circuit to compare the frequency of said alternating voltage with a standard frequency, a control connection between said detector and said beam deflection arrangement to control the scanning in a vertical direction, and a control connection between said frequency discriminator and said beam deflection arrangement to control the scanning in a horizontal direction.

4. A system for obtaining voltages for scanning control purposes comprising in combination a target to receive an exploring point, a deflection circuit arranged to cause said exploring point to scan said target in a predetermined scanning raster, means associated with said target for generating as a result of said scanning a scanning control voltage varying in amplitude at a predetermined frequency, the extent of its variation in amplitude depending upon the position of the exploring point with respect to a desired line of scanning, and the frequency of said control voltage depending upon the velocity of said exploring point with respect to a desired velocity, a detector connected to said aforementioned means, a frequency discriminator, a control connection between said detector and said beam deflection arrangement to control the scanning in a vertical direction, and a control connection between said frequency discriminator and said beam deflection arrangement to control the scanning in a horizontal direction.

5. A system for obtaining voltages for scanning control purposes comprising in combination a target to receive an exploring point, a deflection circuit arranged to cause said exploring point to scan said target in a predetermined scanning raster, means associated with said target having a periodically interrupted edge positioned along each desired scanning line position for generating as a result of said scanning a scanning control voltage varying in amplitude at a predetermined frequency, the extent of its variation in amplitude depending upon the position of the exploring point with respect to a desired line of scanning, and the frequency of said control voltage depending upon the velocity of said exploring point with respect to a desired velocity, a rectifier connected to said aforementioned means, a frequency discriminator, a control connection between said rectifier and said beam deflection arrangement to control the scanning in a vertical direction, and a control connection between said frequency discriminator and said beam deflection arrangement to control the scanning in a horizontal direction.

6. A system for obtaining voltages for scanning control purposes comprising in combination a target to receive an exploring point, a deflection circuit arranged to cause said exploring point to scan said target in a predetermined scanning raster, means optically associated with said target having a periodically interrupted edge positioned along each desired scanning line position for generating as a result of said scanning a scanning control voltage varying in amplitude at a predetermined frequency, the extent of its variation in amplitude depending upon the position of the exploring point with respect to a desired line of scanning, and the frequency of said control voltage depending upon the velocity of said exploring point with respect to a desired velocity, a detector connected to said aforementioned means, a frequency discriminator, a control connection between said detector and said beam deflection arrangement to control the scanning in a vertical direction, and a control connection between said frequency discriminator and said beam deflection arrangement to control the scanning in a horizontal direction.

7. A system for obtaining voltages for scanning control purposes comprising in combination a target to receive an exploring point, a deflection circuit arranged to cause said exploring point to scan said target in a predetermined scanning raster, a pattern optically projected on said target having a periodically interrupted edge positioned along each desired scanning line position for generating as a result of said scanning a scanning control voltage varying in amplitude at a predetermined frequency, the extent of its variation in amplitude depending upon the position of the exploring point with respect to a desired line of scanning, and the frequency of said control voltage depending upon the velocity of said exploring point with respect to a desired velocity, a detector connected to said aforementioned means, a frequency discriminator, a control connection between said detector and said beam deflection arrangement to control the scanning in a vertical direction, and a control connection between said frequency discriminator and said beam deflection arrangement to control the scanning in a horizontal direction.

8. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in repeating and spaced areas and having edges along the position of a desired scanning line, a detector connected to receive the electrical current formed by said pattern, a frequency discriminator connected to receive the electrical current formed by said pattern, a control connection between said detector and said beam deflection arrangement to control the scanning in a vertical direction, and a control connection between said frequency discriminator and said beam deflection arrangement to control the scanning in a horizontal direction.

9. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in regularly repeating and spaced areas and having edges along the position of each desired scanning line, a detector connected to receive the electrical current formed by said pattern, a frequency discriminator connected to receive the electrical current formed by said pattern, a control connection between said detector and said beam deflection arrangement to control the scanning in a vertical direction, and a control connection between said frequency discriminator and said beam deflection arrangement to control the scanning in a horizontal direction.

10. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in repeating and spaced areas and having edges along the position of a desired scanning line, a detector connected to receive the electrical current formed by said pattern, a frequency discriminator connected to receive the electrical current formed by said pattern, said frequency discriminator arranged to receive a standard frequency control signal, a control connection between said detector and said beam deflection arrangement to control the scanning in a vertical direction, and a control connection between said frequency discriminator and said beam deflection arrangement to control the scanning in a horizontal direction.

11. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in repeating and spaced areas and having edges along the position of a desired scanning line, said areas of different sensitivity compared to the remaining area of said target, a detector connected to receive the electrical current formed by said pattern, a frequency discriminator connected to receive the electrical current formed by said pattern, a control connection between said detector and said beam deflection arrangement to control the scanning in a vertical direction, and a control connection between said frequency discriminator and said beam deflection arrangement to control the scanning in a horizontal direction.

12. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in repeating and spaced areas and having edges along the position of a desired scanning line, said areas of increased light sensitivity compared to the remaining area of said target, a detector connected to receive the electrical current formed by said pattern, a frequency discriminator connected to receive the electrical current formed by said pattern, a control connnection between said detector and said beam deflection arrangement to control the scanning in a vertical direction, and a control connection between said frequency discriminator and said beam deflection arrangement to control the scanning in a horizontal direction.

13. A system for obtaining voltages for scanning control purposes comprising in combination a target to receive an exploring point, a deflection circuit arranged to cause said exploring point to scan said target in a predetermined scanning raster, an electrical current forming pattern associated with said target, said pattern shaped in repeating and spaced areas, said spaced areas having edges along the position of a desired scanning line, said areas being of conducting material, a detector connected to receive the electrical current formed by said pattern, a frequency discriminator connected to receive the electrical current formed by said pattern, a control connection between said detector and said beam deflection arrangement to control the scanning in a vertical direction, and a control connection between said frequency discriminator and said beam deflection arrangement to control the scanning in a horizontal direction.

14. A system for obtaining voltages for scanning control purposes comprising in combination a target to receive an exploring point, a deflection circuit arranged to cause said exploring point to scan said target in a predetermined scanning raster, an electrical current forming pattern optically projected on said target, said pattern shaped in repeating and spaced areas having edges along the position of the desired scanning lines, a detector connected to receive the electrical current formed by said pattern, a frequency discriminator connected to receive the electrical current formed by said pattern, a control connection between said detector and said beam deflection arrangement to control the scanning in a vertical direction, and a control connection between said frequency discriminator and said beam deflection arrangement to control the scanning in a horizontal direction.

15. A system for obtaining voltages for scanning control purposes comprising in combination a target to receive an exploring point, a deflection circuit arranged to cause said exploring point to scan said target in a predetermined scanning raster, an electrical current forming pattern optically projected on said target, said pattern shaped in repeating and spaced areas having edges along the position of the desired scanning lines, a detector connected to receive the electrical current formed by said pattern, a frequency discriminator connected to receive the electrical current formed by said pattern and electrical current of a predetermined frequency, a control connection between said detector and said beam deflection arrangement to control the scanning in a vertical direction, and a control connection between said frequency discriminator and said beam deflection arrangement to control the scanning in a horizontal direction.

16. In a color television system involving a plurality of selected component color images, a system for obtaining voltages for scanning control purposes to improve registration of said images comprising in combination a target for each selected component color image, each of said targets adapted to receive an exploring point, separate deflection circuits arranged to cause each of said exploring points to scan said targets in a predetermined scanning raster, an electrical current forming pattern associated with each of said targets and mutually registered, said pattern shaped in repeating and spaced areas having edges along the position of the desired scanning lines, a separate detector connected to receive the electrical current formed by each of said patterns, a separate frequency discriminator connected to receive the electrical current formed by each of said patterns, a control connection between each of said detectors and its associated beam deflection arrangements to control the scanning in a vertical direction, and a control connection between each of said frequency discriminators and its associated beam deflection arrangement to control the scanning in a horizontal direction.

17. In a color television system involving a plurality of selected component color images, a system for obtaining voltages for scanning control purposes to improve registration of said images comprising in combination a target for each selected component color image, each of said targets adapted to receive an exploring point, separate deflection circuits arranged to cause each of said exploring points to scan said targets in a predetermined scanning raster, an electrical current forming pattern associated with each of said targets and mutually registered, said pattern shaped in repeating and spaced areas having edges along the position of the desired scanning lines, a separate detector connected to receive the electrical current formed by each of said patterns, a separate frequency discriminator for all but one of said component colors and connected to receive the electrical current formed by its color associated pattern, a comparison connection between each of said frequency discriminators and the pattern for which there is no frequency discriminator, a control connection between each of said detectors and its associated beam deflection arrangements to control the scanning in a vertical direction, and a control connection between each of said frequency discriminators and its associated beam deflection arrangement to control the scanning in a horizontal direction.

18. A system for generating control voltages comprising in combination a target to receive an exploring point adapted to form a scanning raster thereon, means associated with said target to form an electrical charge pattern at said target, said charge pattern arranged in strips oriented in a first direction and in a second direction perpendicular to said first direction, the strips oriented in said first direction having edges positioned along scanning lines of said scanning raster and the strips which are oriented in said second direction arranged to produce an alternating voltage of a predetermined frequency during scanning, means for deriving an alternating voltage upon the scanning of said charge pattern, means connected to said means for deriving an alternating voltage to convert said alternating voltage into a direct voltage, the amplitude of said direct voltage proportional to the amplitude of said alternating voltage, means connected to said means for deriving an alternating voltage to compare the frequency of said alternating voltage with a predetermined frequency, a control connection between said means to convert said alternating voltage into a direct voltage and said beam deflection arrangement to control the scanning in one direction, and a control connection between said means to compare the frequency of said alternating voltage with a standard frequency and said beam deflection arrangement to control the scanning in another direction.

FRANCIS J. DARKE, JR.

REFERENCES CITED

The following references are of record in the file of this patent:

UNITED STATES PATENTS

| Number | Name | Date |
|---|---|---|
| 2,098,598 | Schrote | Nov. 9, 1937 |
| 2,307,212 | Goldsmith | Jan. 5, 1943 |
| 2,385,563 | Beers | Sept. 25, 1945 |
| 2,415,059 | Zworykin | Jan. 28, 1947 |